June 7, 1932.  L. MALICAY  1,862,413
SACK HOLDER
Filed Jan. 27, 1930   3 Sheets-Sheet 1

Leandro Malicay,
INVENTOR

BY *Victor J. Evans*
ATTORNEY

WITNESS:

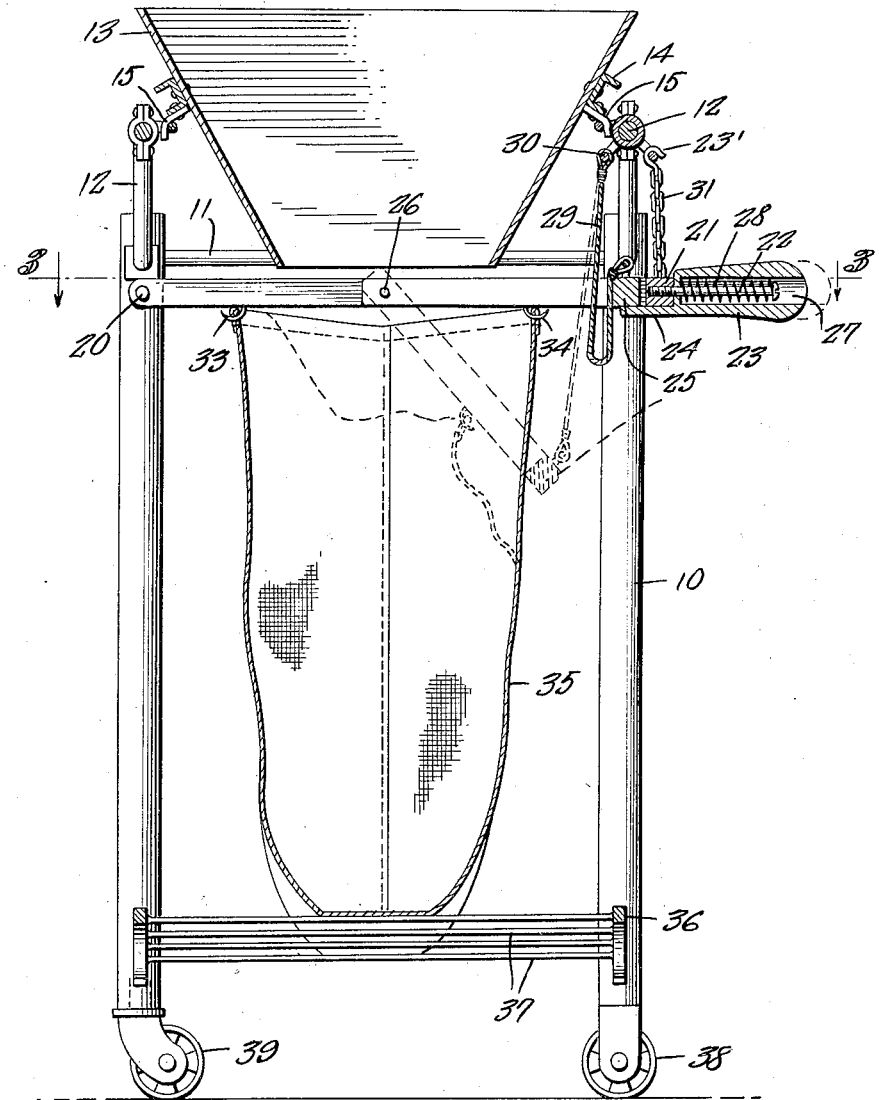

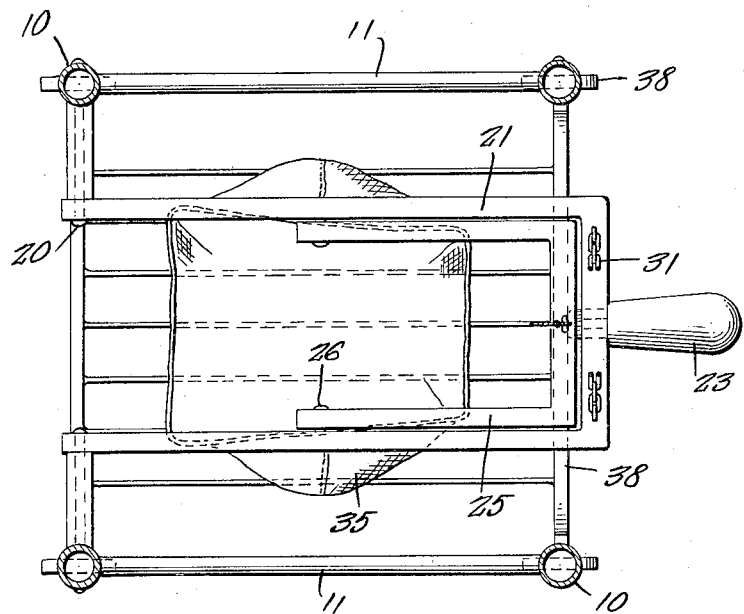

Patented June 7, 1932

1,862,413

UNITED STATES PATENT OFFICE

LEANDRO MALICAY, OF WESTWOOD, CALIFORNIA

SACK HOLDER

Application filed January 27, 1930. Serial No. 423,808.

This invention relates to sack holders and has for an object the provision of means for supporting a sack in an upright position with the mouth open for convenience in filling.

Another object of the invention is the provision of a supporting frame by means of which a sack may be supported for filling, together with a hopper for directing materials into the mouth of the sack, means being provided for removably supporting the hopper and adjusting the supporting means in accordance with the size of the hopper.

Another object of the invention is the provision of novel means for attaching the sack to the frame and supporting the open mouth of the sack so that the latter will be in proper position to receive material from the hopper without danger of said material passing upon the outside of the sack.

Another object of the invention is the provision of means for so mounting and supporting the sack that the material therein may be shaken during the filling operation and thus compactly arrange the material within the sack.

With the above and other objects in view, the invention further includes the following novel features and details of construction, to be hereinafter more fully described, illustrated in the accompanying drawings and pointed out in the appended claims.

In the drawings:—

Figure 2 is a sectional view on the line 2—2 of Figure 1, the manner of attaching the sack being illustrated by dotted lines.

Figure 3 is a section on the line 3—3 of Figure 2.

Figure 4 is a fragmentary perspective view showing the hopper carried attaching member.

Figure 5 is a like view showing the frame carried member for removably receiving the hopper carried member.

Figure 1:
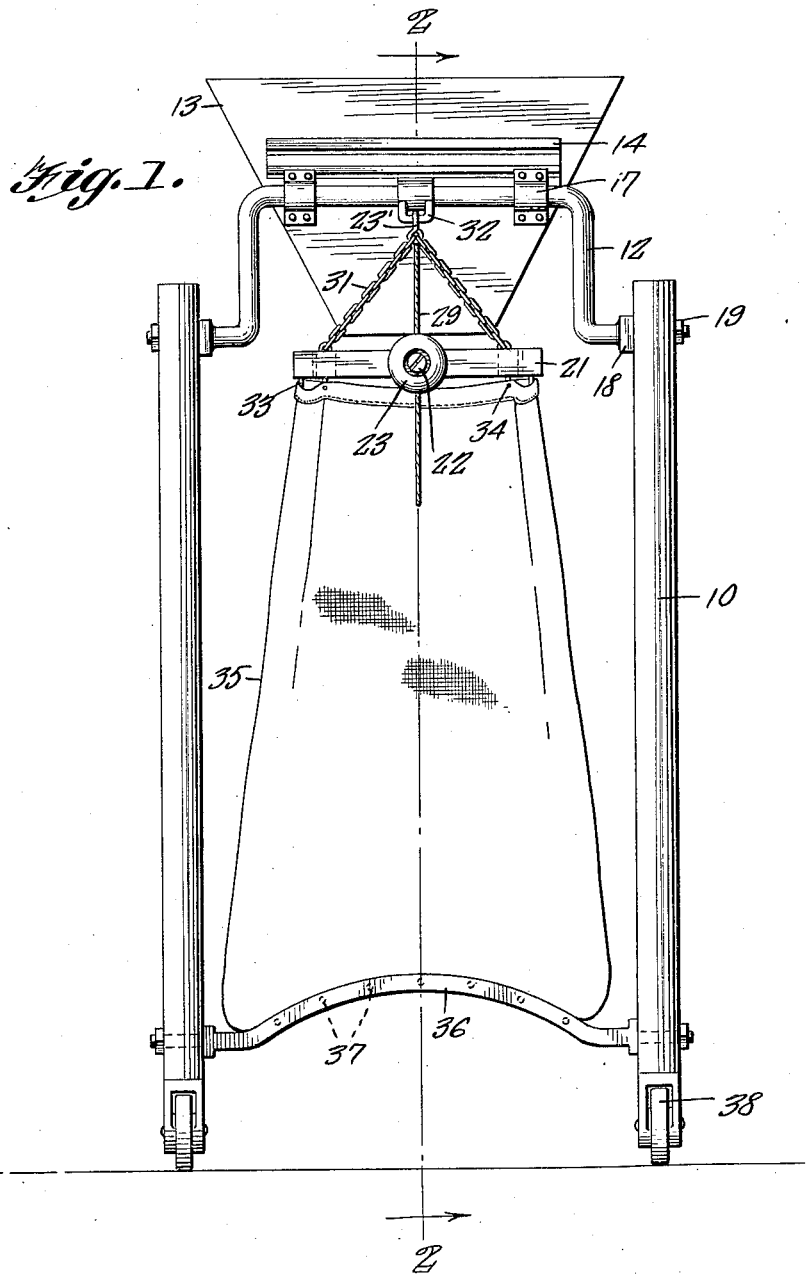
Figure 1 is an elevation of the invention showing a sack in filling position.

Referring to the drawings in detail wherein like characters of reference denote corresponding parts, the holder or support as shown comprises a main frame which includes vertically disposed standards 10. The upper ends of these standards are connected by bars 11 and by arched bars 12, the latter serving to detachably support the hopper 13 for convenience in filling a sack.

The hopper 13 includes relatively inclined walls and is open at the top and bottom and has attached thereto angle bars 14, from which extend hook-shaped fingers 15. These fingers are detachably engaged with U-shaped members 16 which are clamped to the bars 12 as shown at 17, so that the hopper 13 is removably supported by the arch-shaped bars. The opposite ends of the bars 12 extend through the upper ends of the standards 10 and are provided with stop collars 18 and nuts 19. The bars 12 may thus be pivotally adjusted in the upper ends of the standards so that different size hoppers may be accommodated for the use of different materials.

Pivotally mounted in the main supporting frame as shown at 20 is one end of a relatively movable frame 21. This frame is substantially U-shaped in plan and has extending therefrom a bolt 22. Slidingly mounted upon this bolt is a handle 23 and this handle carries an extension 24 which engages beneath and supports one end of a stretcher frame 25. The opposite end of this frame is pivotally mounted within the movable frame 21 as shown at 26, so that the frame 25 may be moved independently of the frame 21, or both frames may be simultaneously moved when the frame 25 is engaged by the extension in the handle 23.

Mounted upon the bolt 22 beneath the head thereof and the inner end of a socket 27 provided in the handle is a coiled spring 28 which serves to yieldingly force the handle inward. A steel or other cable 29 connects the frame 25 with one of the bars 12, as shown at 30.

In order to support the frame 21 in horizontal position, chains or cables 31 are secured to the frame 21 and to the bar 12 as shown at 32. This securing means is in the form of a hook 23' which engages over a U-shaped member carried by the bar 12.

The frame 21 is provided with hooks 33, while the frame 25 is provided with hooks 34 for engagement by the upper edges of a sack 35. A supporting platform is arranged to be engaged by and support the lower end of the sack. This platform includes arched bars 36 whose opposite ends are secured to the lower ends of the standards 10. Rods 37 connect these bars and provide a platform for the sack. The platform thus serves both as a support for the sack and takes the strain off of the upper end, and spacing means for the lower ends of the standards 10.

When it is desired to attach a sack in position for filling, the handle 23 is pulled outward to release the frame 25 from the extension 24. This frame 25 will then drop downward to the position shown by the dotted lines in Figure 2.

The sack may then be secured to the hooks 33 and 34 as shown by the dotted lines in the said figure and when the stretcher frame 25 is raised and again engaged by the extension 24, the mouth of the bag will be relatively taut and close beneath the frames 21 and 25. If desired, the frame 21 may also be pivotally lowered by disengaging the hook 23'. If it is desired to pack the material closely within the bag, the hook 23' may be disengaged and the frame 21 manipulated to shake the bag and shake the contents thereof downward to the bottom.

The standards 10 are supported upon rollers 38 and casters 39 for conveniently moving the holder.

The invention is susceptible of various changes in its form, proportions and minor details of construction and the right is herein reserved to make such changes as properly fall within the scope of the appended claims.

Having described the invention what is claimed is:—

1. In a sack holder, a main supporting frame, a relatively movable frame, means to pivotally secure one end of the relatively movable frame to the main frame, means to detachably secure the other end of the relatively movable frame to the main frame, a stretcher frame carried by the movable frame, and a combined movable frame handle and stretcher frame latch to manipulate the movable frame and hold the stretcher frame in position.

2. In a sack holder, a main supporting frame, a relatively movable frame, means to pivotally secure one end of the relatively movable frame to the main frame, means to detachably secure the other end of the relatively movable frame to the main frame, a stretcher frame carried by the movable movable frame, a handle movably secured to the movable frame, and means carried by the handle to engage and support one end of the stretcher frame.

3. In a sack holder, a main supporting frame, a relatively movable frame pivotally secured thereto, releasable means to support the movable frame in horizontal position, a stretcher frame arranged within and having one end pivotally secured to the movable frame, means carried by the movable and stretcher frames for engagement with the sack, means to hold the stretcher frame against independent pivotal movement, a handle for the movable frame, and means carried by the handle to support the other end of the stretcher frame.

In testimony whereof I affix my signature.
LEANDRO MALICAY.